US012771069B2

(12) United States Patent
Christoph

(10) Patent No.: US 12,771,069 B2
(45) Date of Patent: Oct. 20, 2026

(54) SECURING DEVICE FOR HIGH-VOLTAGE CONNECTIONS OF AN ELECTRICALLY POWERED VEHICLE

(71) Applicant: Vitesco Technologies GmbH, Regensburg (DE)

(72) Inventor: Markus Christoph, Munich (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 363 days.

(21) Appl. No.: 18/417,455

(22) Filed: Jan. 19, 2024

(65) Prior Publication Data

US 2024/0250475 A1 Jul. 25, 2024

(30) Foreign Application Priority Data

Jan. 24, 2023 (DE) ..................... 10 2023 200 501.8

(51) Int. Cl.

*H01R 13/639* (2006.01)
*H01R 13/53* (2006.01)
*H01R 13/627* (2006.01)

(52) U.S. Cl.

CPC ........... *H01R 13/639* (2013.01); *H01R 13/53* (2013.01); *H01R 13/6271* (2013.01); *H01R 2201/26* (2013.01)

(58) Field of Classification Search

CPC .. H01R 13/639; H01R 13/53; H01R 13/6271; H01R 2201/26; H01R 13/707; B60R 16/03; B60L 3/00; B60L 53/16; B62D 25/24

See application file for complete search history.

(56) References Cited

U.S. PATENT DOCUMENTS 5,413,493 A * 5/1995 Hoffman ................. B60L 53/11 200/51.09
7,804,274 B2 * 9/2010 Baxter ............... G06Q 20/3278 414/281

(Continued)

FOREIGN PATENT DOCUMENTS

DE 102012018271 A1 3/2014
WO 2010150975 A1 12/2010

OTHER PUBLICATIONS

Office Action mailed on Oct. 11, 2023 by the Deutsches Patent-und Markenamt in corresponding German Patent Application No. 10 2023 200 501.8. With English translation (13 pages).

*Primary Examiner* — Truc T Nguyen
(74) *Attorney, Agent, or Firm* — Buchanan Ingersoll & Rooney PC

(57) ABSTRACT

A securing device for high-voltage terminals, having a housing with a covering element for covering the high-voltage terminals, a latch for latching the covering element to the housing, and an unlocking key, which has an interlock conductor in a first region and an actuator in a second region for actuating the latch. The housing with the covering element has a first socket for receiving the first region and a second socket for receiving the second region. The unlocking key completes an interlock circuit of the securing device when its first region is received in the first socket, and it can be moved into an unlocking position, in which it actuates the latch with its actuator and releases the latching of the covering element to the housing, when its second region is received in the second socket.

9 Claims, 4 Drawing Sheets

(56) References Cited

U.S. PATENT DOCUMENTS 8,025,526 B1 * 9/2011 Tormey .............. H01R 13/6397 439/372
8,523,596 B2 * 9/2013 Inoue ................. G07C 9/00182 439/352
8,616,909 B2 * 12/2013 Kurumizawa .......... E05B 83/00 439/304
2012/0083148 A1 * 4/2012 Hirashita ............. H01R 13/639 439/304
2013/0040486 A1 * 2/2013 Kurumizawa .......... B60L 53/16 439/350
2013/0078839 A1 * 3/2013 Musk ................... H01R 13/631 439/345
2013/0252448 A1 * 9/2013 Schulte .............. H01R 13/6397 439/304
2014/0065858 A1 * 3/2014 Kojima ................ H01R 13/447 439/131
2014/0094045 A1 * 4/2014 Kojima ................. B60L 3/0069 439/135
2014/0127924 A1 * 5/2014 Kim ........................ B60L 50/52 439/299
2014/0162497 A1 6/2014 Lim
2014/0167695 A1 * 6/2014 Shimizu .................. B60L 53/30 439/304
2014/0170890 A1 * 6/2014 Kurumizawa ..... H01R 13/6397 439/352
2014/0357113 A1 * 12/2014 Fehler .................. H01R 13/639 439/367
2015/0061413 A1 3/2015 Janarthanam et al.
2015/0111408 A1 * 4/2015 Sasaki ..................... B60L 53/16 439/357
2016/0028187 A1 * 1/2016 Kojima ................ H01R 13/639 439/345
2016/0087375 A1 * 3/2016 Yoshizawa ............. B60L 53/18 439/345
2019/0136590 A1 * 5/2019 Patane .................... E05B 81/14
2023/0085351 A1 * 3/2023 Mathews ................ B60L 53/16 439/76.2
2023/0145978 A1 * 5/2023 Guo ........................ B60L 53/16 439/352
2023/0191926 A1 * 6/2023 Cretin .................. H01R 13/629 439/589
2024/0351457 A1 * 10/2024 Venkatesan ............ H01R 13/04

* cited by examiner

SECURING DEVICE FOR HIGH-VOLTAGE CONNECTIONS OF AN ELECTRICALLY POWERED VEHICLE

CROSS REFERENCE TO RELATED APPLICATIONS

This application claims priority to German Patent Application No. 10 2023 200 501.8, filed Jan. 24, 2023, the contents of such applications being incorporated by reference herein.

FIELD OF THE INVENTION

The present invention relates to a securing device for high-voltage terminals of an electrically driven vehicle and an electrically driven vehicle having at least one securing device for the high-voltage terminals of a vehicle battery.

BACKGROUND OF THE INVENTION

High-voltage charging systems of electrically driven vehicles, i.e., for example, hybrid vehicles or purely electrically driven vehicles, require a protective mechanism which prevents access to current-carrying parts. Only after such parts have been de-energized is electric disconnection to permit access. For this purpose, for example, a so-called interlock is used, which represents a short-circuit bridge in the current circuit. Following the withdrawal of the interlock, for example designed as a pin, the interlock circuit is interrupted. The interruption is detected and the system is de-energized and, if necessary, intermediate circuit capacitors are discharged. This process can last for a few seconds, during which access to the high-voltage terminals must still not be possible.

The high-voltage terminals are typically covered by a safety flap. The safety flap may be opened only after the interlock has been withdrawn and the necessary time for disconnection has elapsed. Systems are known in which, following the withdrawal of the interlock, one or more screws have to be removed in order to permit access to the high-voltage terminals. So much time is needed for the removal of the screws that the system can be de-energized in the meantime.

Such a system has the disadvantage that, with the interlock and one or more screws, it has relatively many individual parts which must not be lost. In addition, these individual parts require a plurality of mounting steps. In addition, there is the danger that the interlock is forgotten during the final mounting of the high-voltage charging system, which leads to the system not being able to be started up. This may only become apparent when the vehicle is put into operation.

SUMMARY OF THE INVENTION

An aspect of the present invention is a securing device for high-voltage terminals of an electrically driven vehicle which is constructed particularly simply and is particularly less prone to faulty operation.

According to one aspect of the invention, a securing device for high-voltage terminals of an electrically driven vehicle is specified, wherein the securing device makes the high-voltage terminals accessible when de-energized and inaccessible when energized. Accordingly, the securing device has the object of preventing access to the energized high-voltage terminals and of permitting access only when the system has been de-energized.

For this purpose, the securing device has a housing of the high-voltage terminals with at least one covering element for the mechanical covering of the high-voltage terminals. The covering element is thus suitable to prevent access to the high-voltage terminals. Furthermore, the securing device has at least one latching means, by means of which the covering element is latched to the housing of the high-voltage terminals. Furthermore, the securing device comprises at least one unlocking key, which has at least one interlock conductor in a first region and at least one actuating means in a second region for actuating the at least one latching means. The unlocking key is a separate component, which is separable from the housing of the high-voltage terminals. The housing with the covering element has a first socket for receiving the first region of the unlocking key and a second socket for receiving the second region of the unlocking key. The unlocking key can thus be plugged into or onto the housing in at least two different ways.

The unlocking key is designed in such a way that it completes an interlock circuit of the securing device when its first region is received in the first socket. Furthermore, it is designed in such a way that it can be moved into an unlocking position, in which it actuates the latching means with its actuating means and releases the latching of the covering element to the housing when its second region is received in the second socket.

The securing device has the advantage that the unlocking key combines the functionalities which are needed to actuate the securing device in a single component. Once the unlocking key is received with its first region in the first socket, the interlock circuit of the securing device is completed and the high-voltage terminals are energized. The covering element covers the high-voltage terminals mechanically, so that these are inaccessible. To this end, the at least one latching means of the covering element is latched to the housing. The covering element can thus not be moved into a position in which the high-voltage terminals are accessible. Only when the latching has been released by means of the unlocking key can the covering element be removed. For this purpose, the following steps are required:

Firstly, the unlocking key must be removed from the first socket, by which means the interlock circuit is broken and the de-energization of the high-voltage terminals is initiated. Then, the unlocking key can be plugged with its second region into the second socket, so that the latching means can be actuated. As a result, the latching of the covering element is released and the covering element can be removed in order to expose the now de-energized high-voltage terminals.

To plug the unlocking key into the second socket and to move it into the unlocking position, a few seconds are needed, in which the system can be de-energized and capacitors can be discharged.

Thus, the securing device secures the high-voltage terminals against access in the energized state, no movable components apart from the unlocking key being needed. The securing device is thus particularly simply operable.

According to one embodiment, the at least one covering element is designed as a covering flap on an upper side of the housing, and the at least one latching means is designed as a latching hook, which latches on a housing element on an underside of the housing. The underside of the housing designates in particular that housing side which is inaccessible in the installed state. The upper side designates that housing side from which the high-voltage terminals can be made accessible.

In this embodiment, the high-voltage terminals are accessible as a result of the fact that the covering flap is folded into an open position. This is possible only when the at least one latching means of the covering flap is not latched to the housing. According to this embodiment, the at least one latching means is designed as a latching hook, which extends from the covering flap on the upper side of the housing as far as an underside of the housing and latches on a housing element there.

According to one embodiment, the second region of the unlocking key is designed as a substantially rotationally symmetrical pin, which has the actuating means designed as a projection.

According to this embodiment, the unlocking key has the actuating means in the style of a key bit. An unlocking key of this type is suitable to interact with a securing device in which the second socket is formed as a through hole, of which the cross section corresponds to the cross section of the second region of the unlocking key but wherein the through hole is rotated by an angle α with respect to the unlocking position of the unlocking key.

In this embodiment, the unlocking key can be plugged into the through hole until the second region having the actuating means projects out of the through hole on the underside of the housing. The unlocking key can then be rotated by the angle α into the unlocking position. In the unlocking position, the actuating means of the unlocking key presses against the at least one latching means and releases the latching of the covering element.

The angle α can in particular be 90° but also larger or smaller.

According to one embodiment, the first region and the first socket, and the second region and the second socket, are shape-encoded, in order to prevent the unlocking key from being plugged in erroneously or impermissibly.

This embodiment accordingly provides a poka-yoke function of the unlocking key, in which plugging the unlocking key in erroneously or impermissibly is ruled out, since only the first region fits into the first socket and the second region into the second socket.

According to one embodiment, the first and the second region are formed on mutually opposite ends of the unlocking key. This has the advantage that the unlocking key can be designed particularly simply and there is sufficient space available at the two mutually opposite ends for the respective functionalities of the first region and of the second region. The arrangement of the plug-in and unlocking region in the same region of the unlocking key is likewise possible, i.e. the first region and the second region can also substantially coincide.

According to one embodiment, the housing of the high-voltage terminals has a service cover for covering the covering element for the mechanical covering of the high-voltage terminals as well, wherein the service cover cannot be put in place when the unlocking key is received in the second socket. This can be achieved by the service cover and the unlocking key being designed and dimensioned in such a way that they block each other. On the other hand, the service cover can be put in place when the unlocking key is received in the first socket.

This embodiment has the advantage that the mounting can be completed with the placement of the service cover only when the unlocking key has been removed from the second socket. A fitter who thus has the locking key in their hand will then plug it into the first socket in order to put the service cover in place. Thus, to complete the mounting, the unlocking key is located in its envisaged socket and completes the interlock circuit of the securing device.

As a result, the unlocking key, as part of the interlock circuit, is prevented from being forgotten or lost during the mounting, and the high-voltage charging system being supplied without the unlocking key and thus in a state in which it is unserviceable.

According to another aspect of the invention, an electrically driven vehicle having at least one securing device for high-voltage terminals of a vehicle battery is specified.

BRIEF DESCRIPTION OF THE DRAWINGS

Embodiments of the invention will be described by way of example below with reference to schematic drawings.

DETAILED DESCRIPTION OF THE PREFERRED EMBODIMENTS

Figure 1:
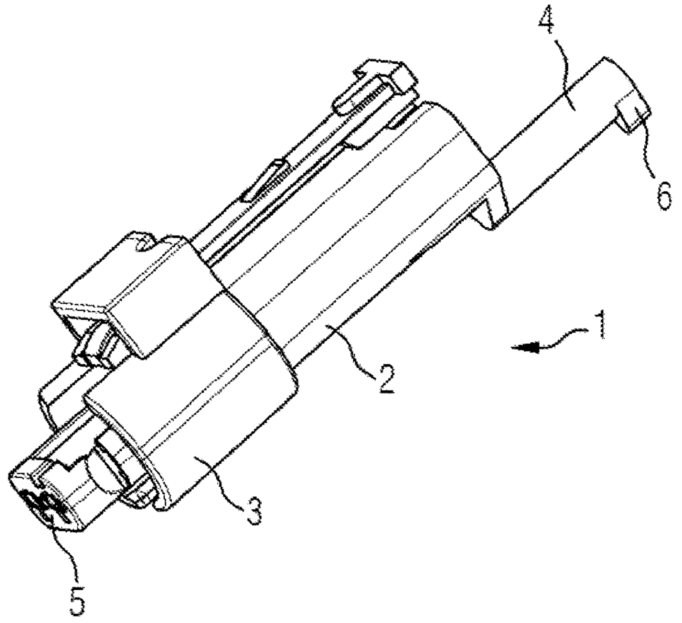
FIG. 1 shows a perspective view of an unlocking key of a securing device according to one embodiment of the invention.

FIG. 1 shows an unlocking key 1 for a securing device for high-voltage terminals of an electrically driven vehicle according to an embodiment of the invention.

The unlocking key 1 has a body 2 which, in particular, can be formed from plastic and has an elongate shape. Molded at a first end of the unlocking key 1 is a first region 3, which has an interlock conductor 5 which is able to close an interlock circuit in the securing device shown in the following figures. In this embodiment, a second region 4, which has an actuating means 6 in the form of a projection, is formed at the end of the unlocking key 1 that is opposite the first region 3. Alternatively, however, the second region 4 can also be arranged adjacent to the first region 3 or coincide with the latter.

Figure 2:
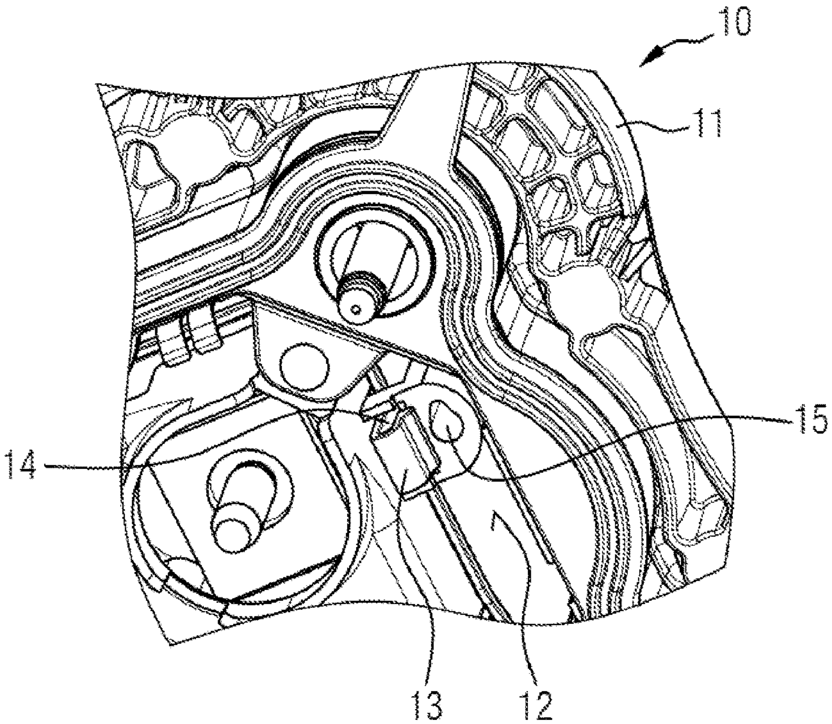
FIG. 2 shows a perspective view of an underside of a securing device according to one embodiment of the invention.

FIG. 2 shows a view of an underside 12 of a housing 11 for the high-voltage terminals. The housing 11 accommodates the connecting point between a vehicle battery and the vehicle electrical system. For the case in which access must be made to the high-voltage terminals, a securing device 10 according to an embodiment of the invention is provided, which ensures that the high-voltage terminals are accessible only in the de-energized state and are inaccessible in an energized state.

For this purpose, the securing device 10 has two sockets, not shown in FIG. 2, for the unlocking key 1, wherein the high-voltage terminals are made accessible when the unlocking key 1 is received in the second socket and are made inaccessible when the unlocking key 1 is received in the first socket.

Of the second socket, FIG. 2 shows only a through hole 15, which extends from an upper side of the housing 11, which is accessible in the installed state of the housing 11, to the underside 12, shown in FIG. 2, which is not accessible in the installed state. The second region 4 of the unlocking key 1 can be guided through the through hole 15. Provided adjacent to the through hole 15 is a further through opening 14, which likewise extends from the upper side of the housing 11 to the underside 12. A latching means 13 in the form of a latching hook, which is connected to a covering flap of the high-voltage terminals on the upper side of the housing 11, is guided through this through opening 14. If the latching means 13 is in the position shown in FIG. 2, then it cannot be pulled back through the through opening 14 but is latched to the housing 11 and keeps the covering flap closed.

Figure 3:
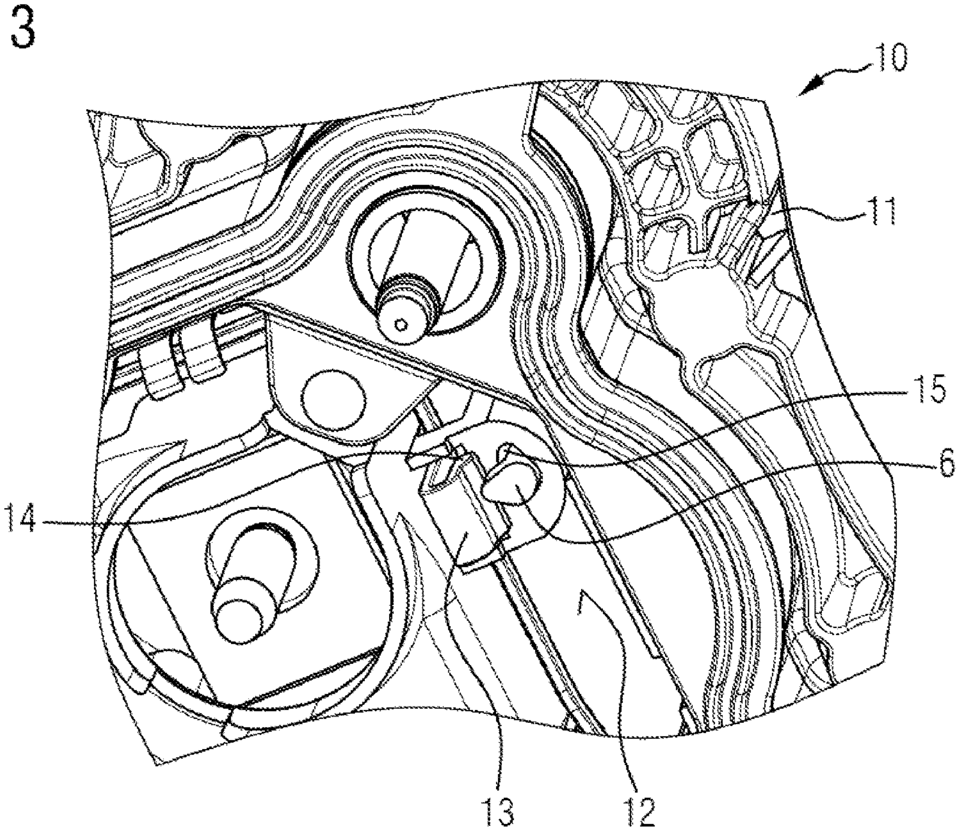
FIG. 3 likewise shows a perspective view of the underside according to FIG. 2.

FIG. 3 likewise shows the underside 12 of the housing 11 but the releasing of the latching is illustrated. The second region 4 of the unlocking key 1 having the actuating means 6 has been guided through the through hole 15. The cross section of the through hole 15 corresponds to the cross section of the second region 4 having the actuating means 6. FIG. 3 illustrates the situation in which the second region 4 has been guided through the through hole 15 as far as the underside 12 of the housing 11 and has then been rotated through 90°. As a result, the actuating means 6 presses against the latching means 13. Since the latching means 13 is designed as a slightly springy hook, the actuating means 6 compresses the latching means 13 in such a way that the latter can be pulled back through the through opening 14. The latching of the covering flap of the high-voltage terminals, not shown in FIGS. 2 and 3, is therefore released.

Figure 4:
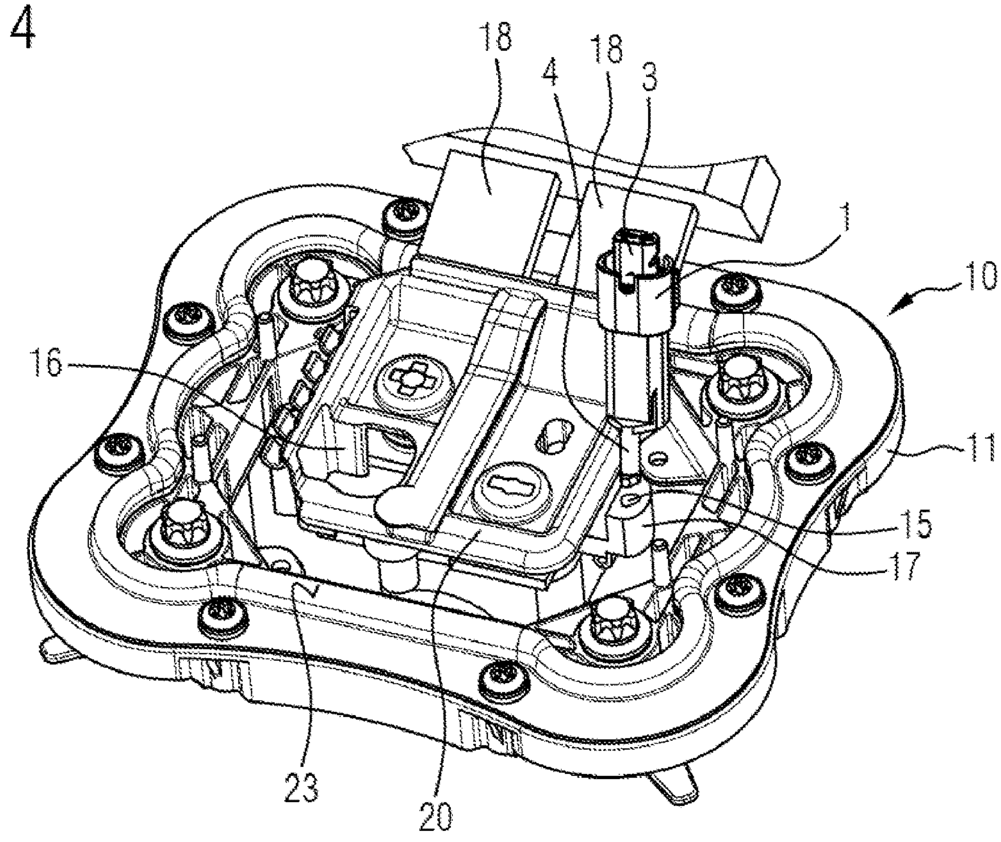
FIG. 4 shows a perspective view of an upper side of the securing device according to FIGS. 2 and 3.

FIG. 4 shows a view of the housing 11 with the securing device 10 from an upper side 23 of the housing 11. In this view, it is possible to see the covering flap 20, under which the high-voltage terminals, not visible in FIG. 4, are located. Busbars 18 extend under the covering flap 20 and there are in contact with the high-voltage terminals. The region of the busbars 18 which is not covered by the covering flap 20 is provided with electrical insulation. Thus, the covering flap 20, when closed, covers all the current-carrying, not additionally insulated elements.

Also illustrated in FIG. 4 are a first socket 16 for the unlocking key 1 and a second socket 17 for the unlocking key 1. The second socket 17 has the through hole 15, also previously shown in FIGS. 2 and 3, into which the second region 4 of the unlocking key 1 fits. The first socket 16 is suitable to receive the first region 3 of the unlocking key. Arranged in the first socket 16 is an interlock circuit, not specifically illustrated, which is completed by the interlock conductor 5 in the first region 3 of the unlocking key 1 when the first region 3 of the unlocking key 1 is received in the first socket 16. As long as the interlock circuit is completed, the high-voltage terminals are energized and must be kept inaccessible.

FIG. 4 shows a first step for making the high-voltage terminals accessible. To this end, the unlocking key 1 has already been removed from the first socket 16 and is about to be plugged with its second region 4 into the second socket 14, in order to open the covering flap 20. Since the unlocking key 1 has been removed from the first socket 16, the interlock circuit has been interrupted and has begun to de-energize the system.

Figure 5:
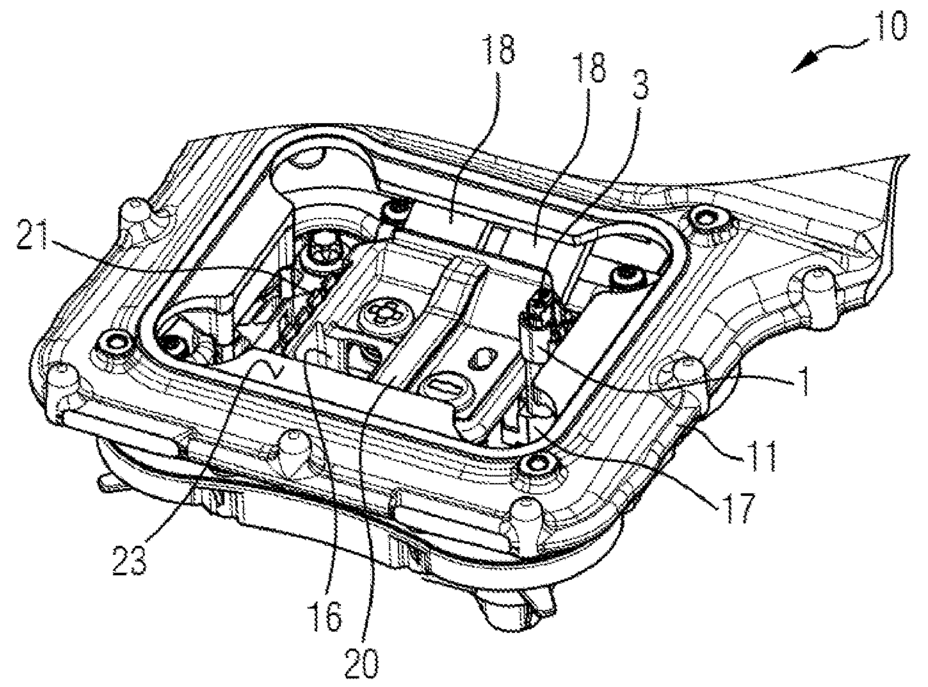
FIG. 5 shows a further perspective view of the upper side of the securing device according to FIGS. 2 to 4.

FIG. 5 shows a further step of making the high-voltage terminals accessible. The unlocking key 1 has been plugged with its second region 4 into the second socket 17 and then projects with the second region 4 through the through hole onto the underside 12 of the housing 11.

After the unlocking key 1 has been plugged into the second socket 17, it is rotated through 90° in the manner described with reference to FIG. 3 in order to release the latching means 13 of the covering flap 20 on the underside 12 of the housing 11. Once this had been done, then the covering flap 20, which is connected to the housing 11 by means of a hinge 21, can be folded open.

Figure 6:
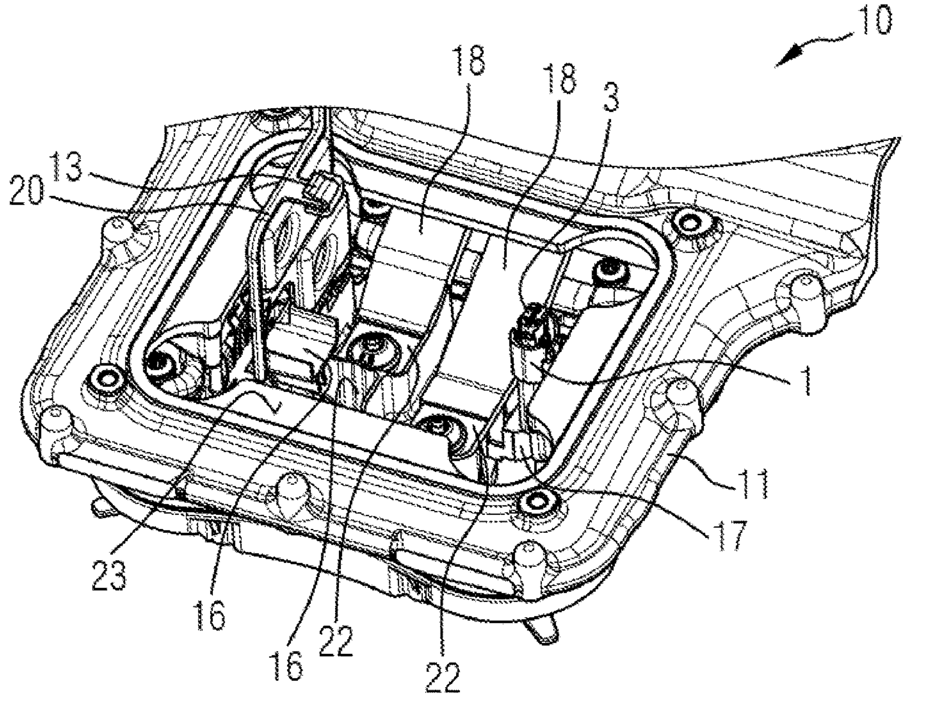
FIG. 6 shows a further perspective view of the upper side of the securing device according to FIGS. 2 to 5.

FIG. 6 shows the housing 11 with the covering flap 20 open and the high-voltage terminals 22 which are now exposed. In this view, it can be seen that the first socket 16 is partly formed by elements of the covering flap 20 and partly by further elements of the housing 11, which also comprise the interlock circuit.

The covering flap 20 could be opened only after the unlocking key 1 had been removed from the first socket 16, plugged with its other end into the second socket 17 and rotated through 90° there. The time which is required for this is sufficient to de-energize the system so that, after the covering flap 20 has been opened, the high-voltage terminals 22 are accessible without danger.

Figure 7:
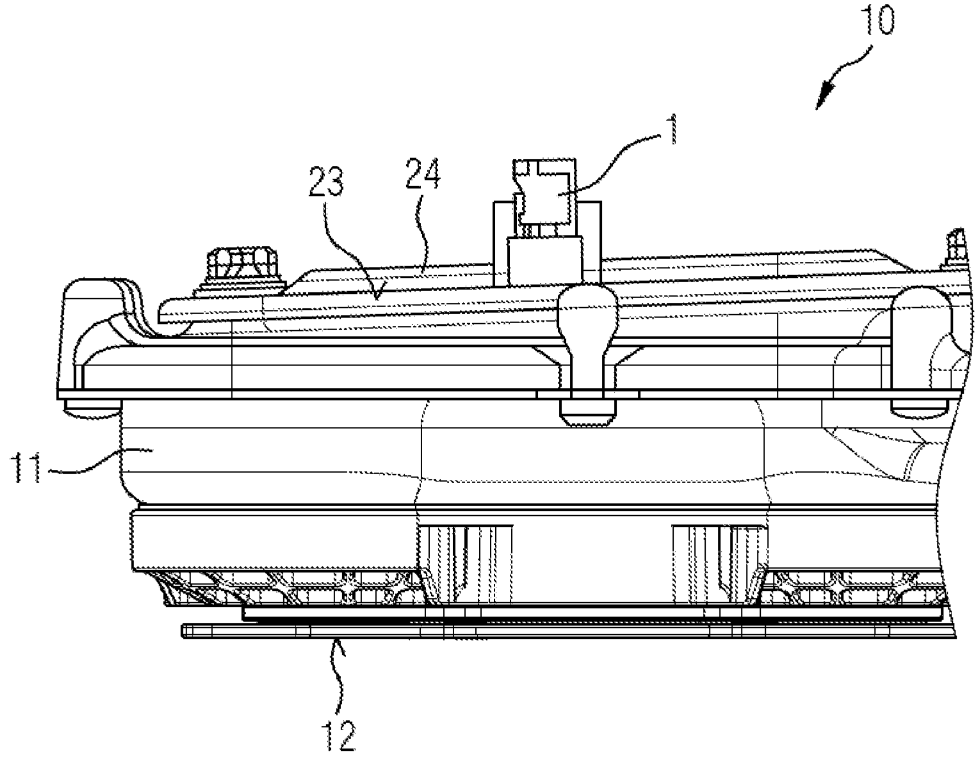
FIG. 7 shows a sectional view of the securing device according to FIGS. 2 to 6.

FIG. 7 shows a sectional view of the housing 11 with the underside 12 that is inaccessible in the installed state, and also the accessible upper side 23. In this view, a service cover 24 has additionally been put in place on the housing 11. The service cover 24 forms the outer covering of the housing 11. The service cover 24 can be put in place only when the unlocking key 1 is received in the first socket 16, i.e. the covering flap 20 has been closed following access to the high-voltage terminals 22, the unlocking key 1 has been removed from the second socket 17 and plugged into the first socket 16, in order to complete the interlock circuit, in order to re-energize the system. If the unlocking key 1 is still in the second socket 17, then the service cover 24 cannot be put in place.

The invention claimed is:

1. A securing device for high-voltage terminals of an electrically driven vehicle, wherein the securing device makes the high-voltage terminals accessible when de-energized and inaccessible when energized, comprising:

a housing of the high-voltage terminals with at least one covering element to mechanically cover the high-voltage terminals, at least one latching means, by which the covering element can be latched to the housing of the high-voltage terminals, and at least one unlocking key, which has at least one interlock conductor in a first region and at least one actuating means in a second region for actuating the at least one latching means, wherein the housing with the covering element has a first socket for receiving the first region of the unlocking key and a second socket for receiving the second region of the unlocking key, and wherein the unlocking key completes an interlock circuit of the securing device when its first region is received in the first socket, and wherein the unlocking key can be moved into an unlocking position, in which it actuates the latching means with its actuating means and releases a latching of the covering element to the housing when its second region is received in the second socket.

2. The securing device as claimed in claim 1, wherein the at least one covering element is designed as a covering flap on an upper side of the housing, and the at least one latching means is designed as a latching hook, which latches on a housing element on an underside of the housing.

3. The securing device as claimed in claim 1, wherein the second region of the unlocking key is designed as a pin, which has the actuating means designed as a projection.

4. The securing device as claimed in claim 3, wherein the second socket is designed as a through hole, of which a cross section corresponds to the cross section of the second region of the unlocking key but wherein the through hole is rotated by an angle $\alpha$ with respect to the unlocking position of the unlocking key.

5. The securing device as claimed in claim 4, wherein the angle $\alpha$ is 90 degrees.

6. The securing device as claimed in claim 1, wherein the first region and the first socket, and the second region and the second socket, are shape-encoded, in order to prevent the unlocking key from being plugged in erroneously or impermissibly.

7. The securing device as claimed in claim 1, wherein the first and the second region are formed on mutually opposite ends of the unlocking key.

8. The securing device as claimed in claim 1, wherein the housing of the high-voltage terminals has a service cover for covering the covering element for the mechanical covering of the high-voltage terminals as well, wherein the service cover cannot be put in place when the unlocking key is received in the second socket.

9. An electrically driven vehicle having at least one securing device as claimed in claim 1 for high-voltage terminals of a vehicle battery.

* * * * *